(12) United States Patent
Brammer et al.

(10) Patent No.: US 8,645,031 B2
(45) Date of Patent: Feb. 4, 2014

(54) APPARATUS FOR SENSING GEARBOX SHIFTING POSITIONS

(75) Inventors: Christian Brammer, Bergen (DE); Mike Heurich, Apelern (DE); Reiner Hölscher, Seelze (DE); Andreas Sievers, Sehnde (DE); Tino Wiggers, Seelze (DE)

(73) Assignee: WABCO GmbH, Hannover (DE)

( * ) Notice: Subject to any disclaimer, the term of this patent is extended or adjusted under 35 U.S.C. 154(b) by 882 days.

(21) Appl. No.: 12/311,883

(22) PCT Filed: Aug. 4, 2007

(86) PCT No.: PCT/EP2007/006905
§ 371 (c)(1),
(2), (4) Date: Apr. 15, 2009

(87) PCT Pub. No.: WO2008/049474
PCT Pub. Date: May 2, 2008

(65) Prior Publication Data
US 2010/0191427 A1 Jul. 29, 2010

(30) Foreign Application Priority Data
Oct. 26, 2006 (DE) .......................... 10 2006 050 429

(51) Int. Cl.
*F16H 61/00* (2006.01)
(52) U.S. Cl.
USPC ................... 701/51; 477/34; 74/335; 475/31; 475/84
(58) Field of Classification Search
USPC ......... 324/601, 207.13, 207.23, 202; 73/1.79; 702/94; 701/51, 55, 56; 477/34; 74/335, 495; 475/131, 31, 84
See application file for complete search history.

(56) References Cited

U.S. PATENT DOCUMENTS

| | | | |
|---|---|---|---|
| 4,519,266 A | 5/1985 | Reinecke | |
| 4,774,465 A | 9/1988 | Nilius | |
| 5,361,650 A * | 11/1994 | Klecker et al. | ............. 74/606 R |
| 6,222,360 B1 | 4/2001 | Tischer et al. | |
| 6,441,609 B2 | 8/2002 | Loibl et al. | |
| 6,626,056 B2 | 9/2003 | Albert et al. | |
| 6,695,748 B2 * | 2/2004 | Kopec et al. | .................. 477/130 |
| 6,717,417 B2 | 4/2004 | Jungbauer et al. | |
| 7,313,979 B2 | 1/2008 | Ehrlich et al. | |
| 2002/0062714 A1 | 5/2002 | Albert et al. | |
| 2004/0211276 A1* | 10/2004 | Ito et al. | .......................... 74/335 |
| 2006/0005647 A1* | 1/2006 | Braford et al. | .................. 74/335 |
| 2006/0009326 A1 | 1/2006 | Stefina | |
| 2008/0070749 A1 | 3/2008 | Schnitzer | |

FOREIGN PATENT DOCUMENTS

| | | |
|---|---|---|
| DE | 91 16 131.2 | 4/1992 |
| DE | 196 30 155 A1 | 1/1998 |
| DE | 198 05 621 A1 | 8/1999 |
| DE | 198 05 783 A1 | 9/1999 |

(Continued)

*Primary Examiner* — Thomas Tarcza
*Assistant Examiner* — Adam Tissot
(74) *Attorney, Agent, or Firm* — Kramer Levin Naftalis & Frankel LLP

(57) ABSTRACT

An apparatus for connection to a transmission actuator of an engine transmission includes sensors for sensing transmission shifting positions of a shifting device. An interface transfers the evaluation signals of the sensors to the control electronics of the transmission actuator. The sensors are arranged such that their spacing from the interface (2) is smaller than the spacing between the interface and the sensed shifting device.

10 Claims, 4 Drawing Sheets

(56) References Cited

FOREIGN PATENT DOCUMENTS

| | | |
|---|---|---|
| DE | 199 08 036 A1 | 8/2000 |
| DE | 199 50 443 A1 | 11/2000 |
| DE | 199 38 110 A1 | 2/2001 |
| DE | 199 44 203 A1 | 3/2001 |
| DE | 100 44 839 A1 | 4/2001 |
| DE | 199 57 750 A1 | 6/2001 |
| DE | 103 47 203 A1 | 6/2004 |
| DE | 10 2005 031 016 A1 | 2/2006 |
| DE | 10 2005 010 692 A1 | 9/2006 |
| EP | 0 238 922 | 9/1987 |
| EP | 1 503 181 A1 | 2/2005 |
| WO | WO 00/11481 | 3/2000 |
| WO | WO 2006/029946 A1 | 3/2006 |
| WO | WO 2006/106076 A2 | 10/2006 |
| WO | WO 2008/012169 A1 | 1/2008 |

* cited by examiner

APPARATUS FOR SENSING GEARBOX SHIFTING POSITIONS

FIELD OF THE INVENTION

The present invention generally relates to an apparatus for sensing transmission shifting positions, and more particularly to a sensor module for making available sensor signals for a transmission actuator.

BACKGROUND OF THE INVENTION

Electronically controlled transmissions of motor vehicles are set by means of transmission actuators which receive electronic control signals and convert them into mechanical actuating positions. In this context, a plurality of actuators, usually pneumatically driven actuating pistons, are used for the gear speed, gate, split and range. In order to determine the travel position of an actuating piston which is used for one of the abovementioned functions, position sensors or travel sensors are used which specify the current position of the piston to an electronic evaluation unit. In this way, a control circuit is provided which receives a specific transmission position as a set point value and sets the transmission in accordance with the input signal.

Typical sensors which are used for this purpose are what are referred to as PLCD travel sensors (permanent magnetic-linear-contactless-displacement sensors). These known sensors are essentially composed of a soft magnetic core which is surrounded by a coil. A permanent magnet which is moved toward the sensor leads to a virtual division of the core. If a suitable alternating current is applied to the primary coil, a voltage which is dependent on the position of the permanent magnet is induced in the evaluation coils. The sensor is supplied with a suitable alternating current, and the signals are processed, evaluated and converted by electronics which are specially provided for this purpose.

Disadvantages of the known devices for setting a transmission are the complex spatial configuration and the connection equipment for connecting the electronic evaluation unit and the sensors to the electronic control unit. The long lines and the fact that the sensors are distributed over long distances entail an increased level of susceptibility to faults. Furthermore, mounting is costly and expensive.

SUMMARY OF THE INVENTION

Generally speaking, it is an object of the present invention to provide an apparatus of the general type under consideration that permits simplified mounting and is less susceptible to faults than conventional constructions.

This object is achieved according to exemplary embodiments of the present invention by means of a device for connection to a transmission actuator of an engine transmission, the device having sensors for sensing transmission shifting positions and an interface for transmitting the evaluation signals of the sensors to the electronic control unit of the transmission actuator.

According to an exemplary embodiment of the present invention, the sensors are arranged such that the spatial distance from the common interface is shorter than the distance between the interface and a shifting device to be sensed. The shifting device can advantageously be a transmission or a transmission actuator, and in particular the actuating pistons of a transmission actuator. According to this embodiment, the sensors are no longer distributed but are arranged as closely as possible to the transmission or to the actuating piston of the transmission actuator in order to determine the travel positions there. The sensors are advantageously arranged in as compact a fashion as possible between the objects to be sensed, for example, the actuating pistons of the transmission actuator or the transmission and the interface, in order to transmit the evaluation signals. The device can be arranged directly on the transmission, for example for the actuating pistons of a transmission actuator or in order to sense the transmission shifting positions of a transmission. The interface is embodied as a single common interface for all the sensors. This makes it possible to position the sensors and the interface closely to one another in a spatially compact arrangement. The evaluation signals of the sensors can accordingly be connected directly via the common, and therefore also single, interface of the inventive device to the further electronic control unit for the transmission actuator or the engine. It will be appreciated that this is a very space-saving and simple design. It is therefore not necessary to provide any cable connections which are long and susceptible to faults between the sensors and the further electronics. Instead, very short connections are possible between the interface and the sensors. The mounting and the replacement of the inventive device can additionally be simplified as a result of the arrangement of the sensors by virtue of the device being configured as a compact modular unit. As a result, the device according to exemplary embodiments of the present invention can be arranged in the form of a sensor module at a position on the transmission actuator with a small number of manual maneuvers. This aspect is additionally improved if the common interface is formed, in a way which is advantageous in terms of space, by a multiplicity of metallic connections, for example, a standardized interface. According to exemplary embodiments of the invention, a plug or a further module is coupled to the interface in order to be able to use the evaluation signals of the sensors to control the transmission.

According to a further exemplary embodiment of the present invention, the sensors are used to sense the gear speed position, the gate position and the split position of the transmission. With conventional constructions these three actuating functions of the transmission actuator cause the sensors to be distributed widely over the transmission actuator or the transmission. The inventive embodiment instead provides a modular compact unit, in which the sensors for all the actuating pistons are located, for three different actuating positions such as gear speed, gate and split. This is successful only if the sensors are provided on the actuating pistons with respect to the signal transmitters such that the compact modular form can be achieved. Signal transmitters can be, for example, small permanent magnets, but they can also be coils or other elements which, as a result of the change in their position, bring about a change in electrical, magnetic or other fields, the change in which is detected by the sensors. For this reason, according to one exemplary embodiment of the present invention, the signal transmitters for the sensors are arranged on the actuating pistons of the transmission actuator or on the transmission such that the inventive compact design of the device with the sensors is made possible.

According to a further exemplary embodiment of the present invention, the sensors will assume essentially the same distance from the actuating pistons which are to be sensed and the travel position of which is to be respectively picked up by a sensor. This is ensured by virtue of the optimum region in which all three sensors can be arranged. If this is taken into account, the sensors can be accommodated in a compact housing, with the result that a modular design of the inventive device is made possible.

According to another exemplary embodiment of the present invention, the sensors are arranged such that their longitudinal axes are essentially perpendicular to one another. A number of advantages are therefore achieved at the same time. Since the sensors are arranged relatively close to one another, there is a certain risk of the signals of the actuating pistons influencing one another reciprocally in such a way that the sensors of the respective other actuating pistons also receive a signal of an actuating piston which is not assigned to them, for example in attenuated form. This aspect of the present invention is based on the idea that the travel position of the actuating pistons is determined by the sensors by means of electromagnetic waves by inductive or capacitive coupling. As a result, coils which detect a change in internal or external magnetic fields are used in the sensors. When sensors are arranged closely to one another, this can lead to the above-mentioned interference. Such interference can be reduced or eliminated if as far as possible the sensors are all arranged perpendicular to one another in pairs. Although a certain reduction in the undesired interference can be brought about if the distances between the sensors are made sufficiently large, this cannot always be ensured to a sufficient degree when there is a very compact design in the spatially restricted conditions on a transmission or transmission actuator.

However, it is an object of the present invention to achieve a compact design. For this reason, it is preferred to arrange the sensors perpendicularly to one another in pairs. This permits a particularly compact arrangement in a common housing with reduced interference.

According to a further exemplary embodiment of the present invention, the respective electronic evaluation unit for the sensors is likewise arranged between the transmission or the actuating pistons of the transmission actuator and the common interface of the sensors. Desirably, the electronic evaluation unit is even advantageously located between the respective sensors and the interface. This also permits a very effective and compact design of the device as a module. It can be advantageously provided in this case that the electronic evaluation unit is embodied as a compact unit for a plurality of sensors or as a compact unit for each sensor. As a result, the connecting lines between the sensors and the electronic evaluation unit are kept very short, which in turn reduces the susceptibility to interference and faults.

Advantageously, the sensors are embodied as PLCD sensors. This ensures a spatially small and compact arrangement within the device according to exemplary embodiments of the present invention. In particular, with respect to PLCD sensors, the paired, perpendicular arrangement of the sensors with respect to one another is advantageous since these sensors are based on a determination of the transmission shifting position of a transmission or the travel position of an actuating piston by means of a signal transmitter (permanent magnet). The coupling between the sensor and signal transmitter is, as in the case of most electromagnetic couplings, directional and spatially limited. Both the spatial proximity between the sensor and the signal transmitter and their orientation with respect to one another is significant. Sensors which are arranged perpendicularly with respect to one another reduce the negative interference which can result from the sensors being arranged close to one another.

According to a further exemplary embodiment of the present invention, the signal transmitters for the respective sensors are arranged on the actuating pistons such that the sensors can be arranged in pairs perpendicularly to one another between the actuating pistons and the common interface. This advantageously ensures that the interaction of the signal transmitters between the respectively assigned sensor is maximized and the interaction between the signal transmitters between the other sensors is minimized.

It is also advantageous if the common interface is embodied as a standardized interface, in particular as a connection according to standard IP6K9K. The interface is protected against the ingress of dirt, water, etc. Standardized interfaces are generally available and can be connected to a large number of different embodiments of transmission actuators. Furthermore, they are spatially compact and can be connected by means of simple manual maneuvers to the elements to be coupled on the transmission actuator or to some other electronics.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

An exemplary embodiment of the present invention will be described by way of example with reference to the following figures, of which.

DETAILED DESCRIPTION OF THE PREFERRED EMBODIMENTS

Figure 1:
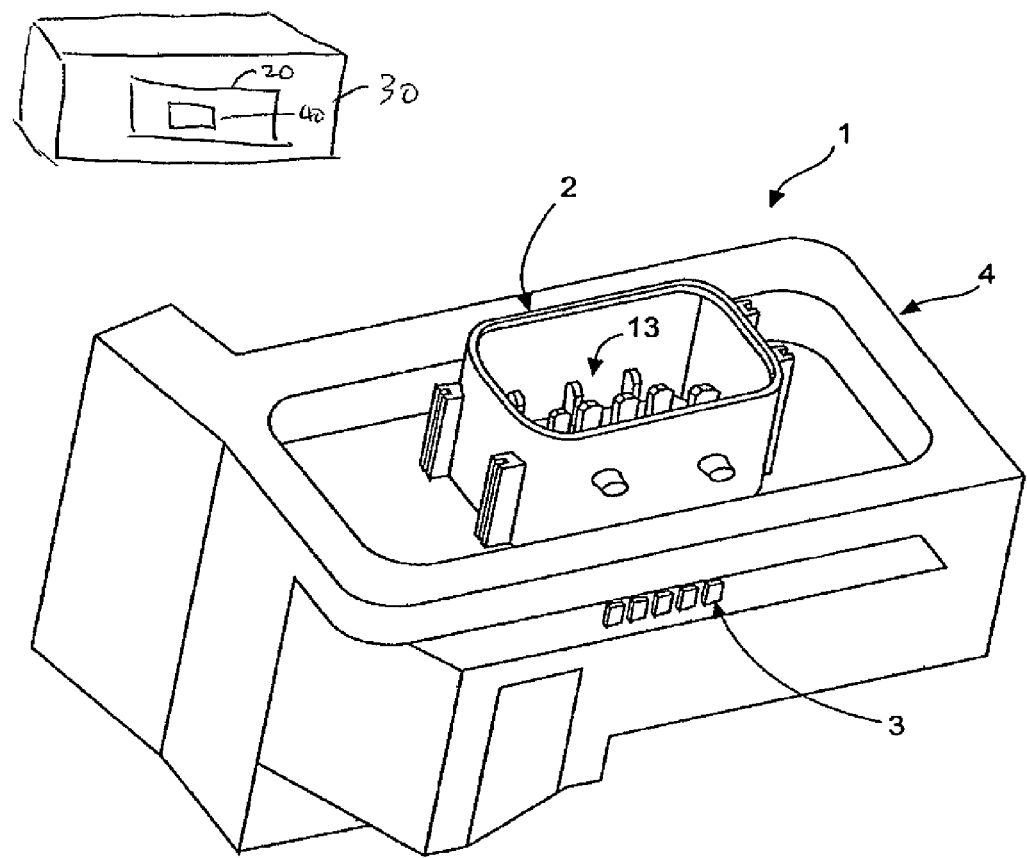
FIG. 1 is a perspective view of a sensor module according to an embodiment of the present invention.

Referring now to the drawing figures, FIG. 1 shows a sensor module according to an exemplary embodiment of the present invention. The sensor module 1 is surrounded by an enclosed housing 4. A first interface 2 and a second interface 3 extend from the housing. The first interface 2 has internal rows 13 of metallic contacts. These contacts conduct the signals of sensors (not illustrated), which are accommodated in the sensor module 1, and the signals of the second interface 3 to the electronic control unit (ECU). The second interface 3 also has a row of contacts. The first interface 2 can advantageously be embodied as a plug-type connection according to the IP6K9K standard. However, other embodiments can also be used, provided that the interface can be coupled to an electronic control unit of a transmission actuator (e.g., transmission actuator 20). The electronic control unit for the transmission actuator must, therefore, have an interface which corresponds to the first interface 2. In one advantageous embodiment, further control signals are also received by the first interface 2 from an electronic control unit (not illustrated) for the transmission actuator, and are passed through the interior of the sensor module 1 to the further (second) interface 3. Electronics can be provided in the sensor module 1 in order to perform further processing of these additional, passed-through signals. In one advantageous embodiment, the signals are, however, connected through to the second internal interface 3 without further processing. These signals can advantageously be signals for actuating electromagnets for the transmission actuator. So that only a single external interface 2 with the outside is formed, the additional lines or signals for the second internal interface 3 are conducted internally through the external interface 2. The housing of the device according to exemplary embodiments of the present invention is configured such that it can be inserted in an optimum, space-saving way into a restricted space on the transmission actuator or even on a transmission.

Figure 2:
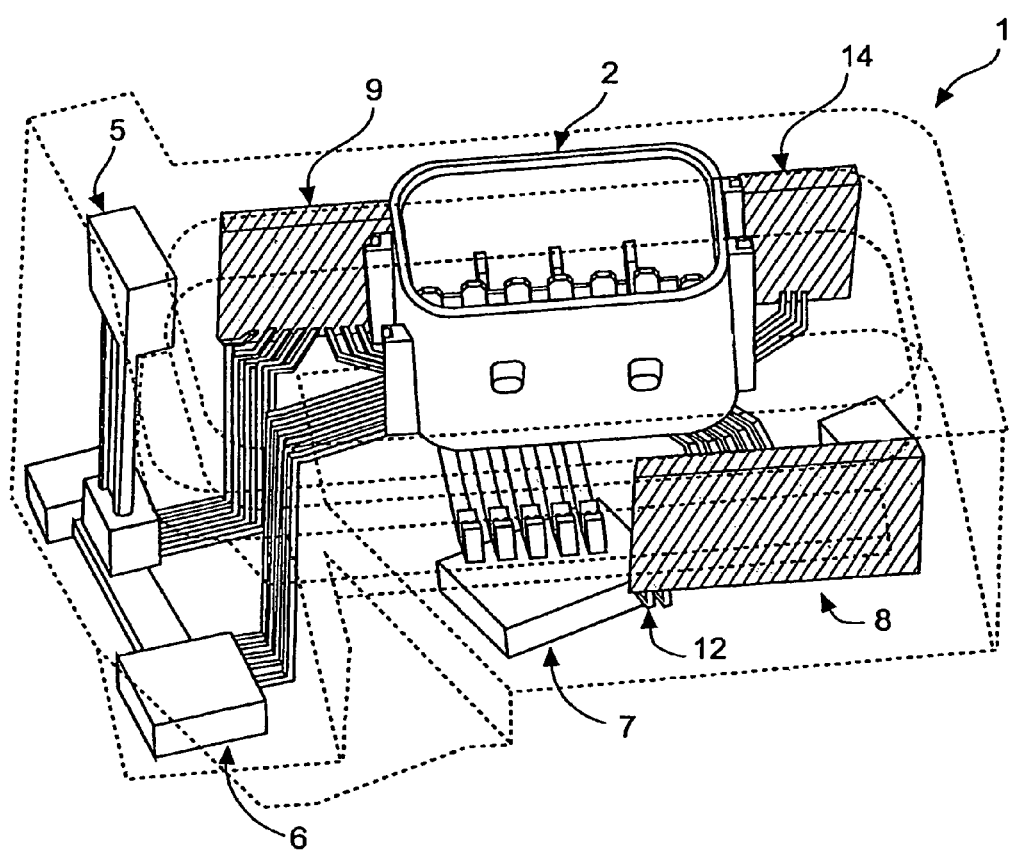
FIG. 2 is a perspective, semi-transparent view of the sensor module according to the exemplary embodiment depicted in FIG. 1.

FIG. 2 shows a sensor module according to the exemplary embodiment of the present invention as in FIG. 1 in a semi-transparent illustration in which the enclosed housing is indicated only in the form of dashes. This method of illustration permits the components arranged in the sensor module to be seen. These are sensors 5, 6, 7 for determining a transmission shifting position, for example, of cylinders of a transmission (e.g., transmission 30) or actuating pistons (e.g., actuating pistons 40). Sensors 5, 6, 7 sense the actuating measures of the transmission actuator either directly on the actuating pistons or on, the transmission. In the exemplary embodiment illustrated in FIG. 2, electronic evaluation units 9, 14, 8 are provided for each sensor 5, 6, 7. The division into three individual components for the electronic evaluation unit is, however, not compulsory. Likewise, a single electronic evaluation unit can be used for all the sensors 5, 6, 7. The signals are fed from the electronic evaluation unit to the interface 2 via connecting lines. The sensors 5, 6, 7 are connected to the evaluation electronic unit via various connecting lines. The components of the evaluation electronic unit 9, 14, 8 are connected to the interface 2. The second interface 3, which makes available signals received by the external, first interface 2, makes available a series of further electrical contacts, for example, for actuating magnets for controlling the pneumatic gates, gear speed and split pistons. The sensors 5, 6, 7 are embodied as a first sensor 5, second sensor 6 and third sensor 7 in a specific arrangement. The sensors 5, 6, 7 can be PLCD sensors. These sensors 5, 6, 7 are provided for sensing the position of each actuating piston of the transmission actuator. This is done, for example, by inductive coupling. In one embodiment as a PLCD sensor, magnets, the movement of which brings about a corresponding signal in the PLCD sensors, are arranged as signal transmitters on each component to be sensed, for example, on the actuating pistons or at a suitable position on the transmission. This signal is converted in a suitable way by the electronic evaluation unit 9, 14, 18 in order for it to be passed on via the first interface 2 to the electronic control unit of the transmission actuator. In one advantageous embodiment, the external interface is designed to communicate with a specific bus system.

Figure 3:
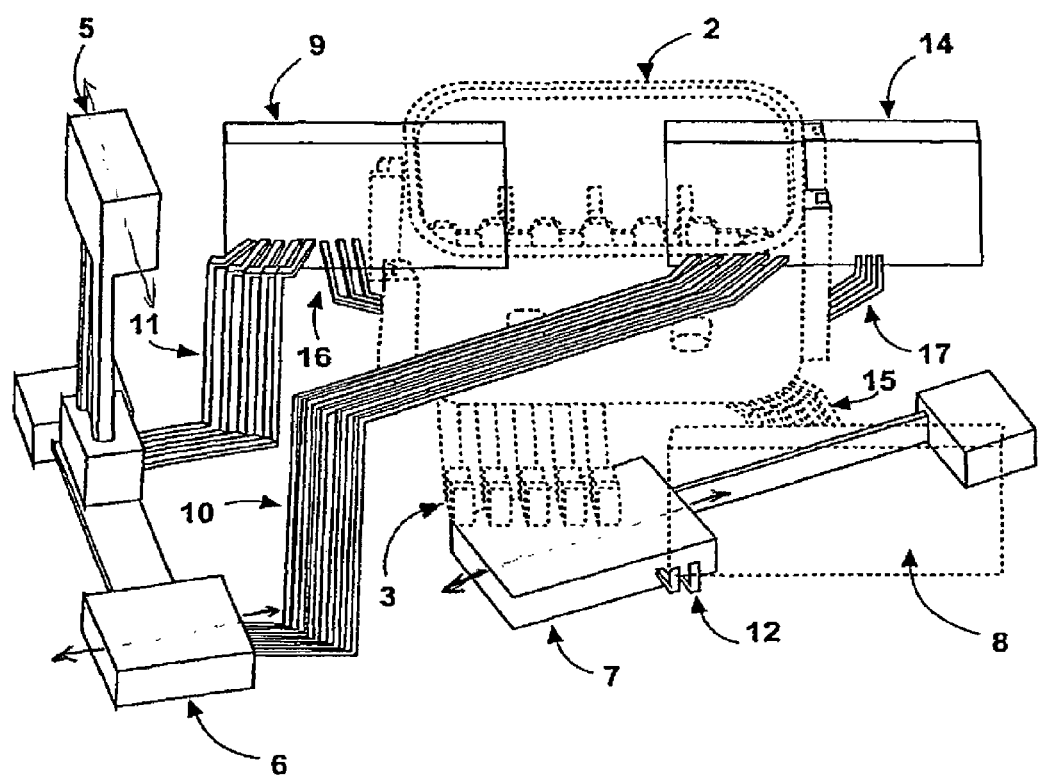
FIG. 3 is a further perspective view of the sensor module according to the exemplary embodiment depicted in FIGS. 1 and 2.

FIG. 3 is a further illustration, providing an even deeper view into the inventive sensor module. Here, the electronic evaluation unit 8 and the first interface 2 are now also illustrated in a transparent way, that is, with dashed lines, and the closed housing is completely removed. As a result, it is possible to see the sensor 7, which extends in a direction of the sensor module, in a similar way to the sensors 5 and 6. The connecting lines 10, 11, 12 connect the sensors 5, 6, 7 and their respective electronic evaluation unit 9, 14, 18. The electronic evaluation unit 8, 9, 14 transmits the evaluated signals via the connecting lines 15, 16, 17 and the interface. The evaluation signals of the sensors are transmitted to the electronic evaluation unit 9, 14, 8 via the connecting lines 10, 11, 12.

Figure 4:
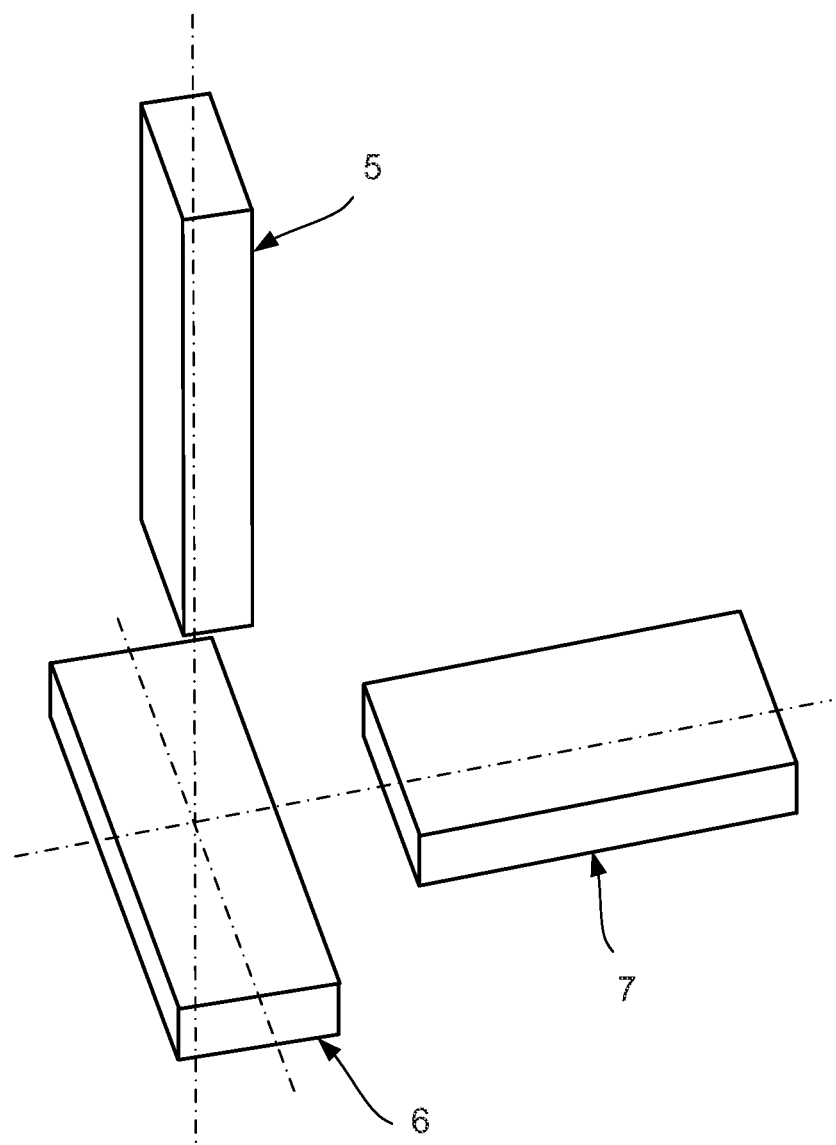
FIG. 4 is a perspective view of sensors of a sensor module according to an exemplary embodiment of the present invention.

In FIG. 3, the sensors are shown arranged perpendicular to one another in pairs. For example, arrows are shown representing the substantially perpendicular longitudinal axes of the sensors 5, 6, and 7. This exemplary arrangement specifies how the signal transmitters are to be arranged on the transmission or on the actuating pistons or cylinders of the transmission actuator. An advantage of such an arrangement is that the signals of the signal transmitters on the actuating pistons or in the transmission have a weaker influence on one another. However, the paired perpendicular arrangement is just one of a number of possibilities. The mutual interference of the signal transmitters or of the sensor signals can also be limited by means of a sufficient distance between the sensors or signal transmitters. The division of the electronic evaluation system into three individual components 9, 14 and 8 is also illustrated, but is not compulsory. It is decisive that the electronic units 9, 14, 8 and the sensors 5, 6, 7 are located between the actuating pistons or the transmission and the interface 2. This permits a very compact design. The inventive sensor module in accordance with the exemplary embodiment described above therefore constitutes the universal interface between the actuators and the sensors 5, 6, 7, which are necessary to operate a transmission actuator. Most of the control signals and sensor signals are advantageously conducted through the first interface 2 here. As a result, the expenditure on plugs is reduced compared to the prior art. A lower number of plug-type connections reduces the risk of the ingress of dirt and of other undesired interfering influences. Overall, susceptibility to faults is also reduced by decreasing the number of external interfaces. The expenditure on mounting is also reduced. In one exemplary embodiment, the sensors can also be arranged such that their longitudinal axes are perpendicular to one another, as shown in FIG. 4.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An apparatus connectable to a transmission actuator of an engine transmission, said apparatus comprising at least three sensors for sensing transmission shifting positions of a shifting device, and an interface for transmitting evaluation signals of said at least three sensors to an electronic control unit of said transmission actuator, said at least three sensors being arranged such that (i) the distance between said at least three sensors and said interface is less than the distance between said interface and said shifting device, and (ii) longitudinal axes of said at least three sensors are substantially perpendicular to each other.

2. The apparatus as claimed in claim 1, wherein said shifting device is actuating pistons of said transmission actuator.

3. The apparatus as claimed in claim 1, wherein said shifting device is a transmission.

4. The apparatus as claimed in claim 1, wherein said at least three sensors are operable to sense a plurality of actuating positions of said transmission actuator.

5. The apparatus as claimed in claim 2, wherein each of said at least three sensors corresponds to an actuating piston of said actuating pistons, said at least three sensors being arranged such that each of said at least three sensors is approximately the same distance from a corresponding actuating piston.

6. The apparatus as claimed in claim 2, further comprising at least one electronic evaluation unit for said at least three sensors, said at least one electronic evaluation unit being arranged compactly between said actuating pistons and said interface.

7. The apparatus as claimed in claim 1, wherein said at least three sensors include PLCD sensors.

8. The apparatus as claimed in claim 1, wherein said interface is a plug-type connection according to the IP6K9K standard.

9. The apparatus as claimed in claim 1, wherein said interface is a first interface, and further comprising a second interface that allows at least one device to interface with signals received by said first interface.

10. The apparatus as claimed in claim 6, wherein said at least one electronic evaluation unit is arranged in a compact manner between said at least three sensors and said interface.

* * * * *

UNITED STATES PATENT AND TRADEMARK OFFICE
CERTIFICATE OF CORRECTION

PATENT NO. : 8,645,031 B2  
APPLICATION NO. : 12/311883  
DATED : February 4, 2014  
INVENTOR(S) : Brammer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Twenty-ninth Day of September, 2015

Michelle K. Lee
*Director of the United States Patent and Trademark Office*